No. 782,614. PATENTED FEB. 14, 1905.
H. L. MANNING.
PIE MAKING MACHINE.
APPLICATION FILED NOV. 2, 1904.
5 SHEETS—SHEET 5.
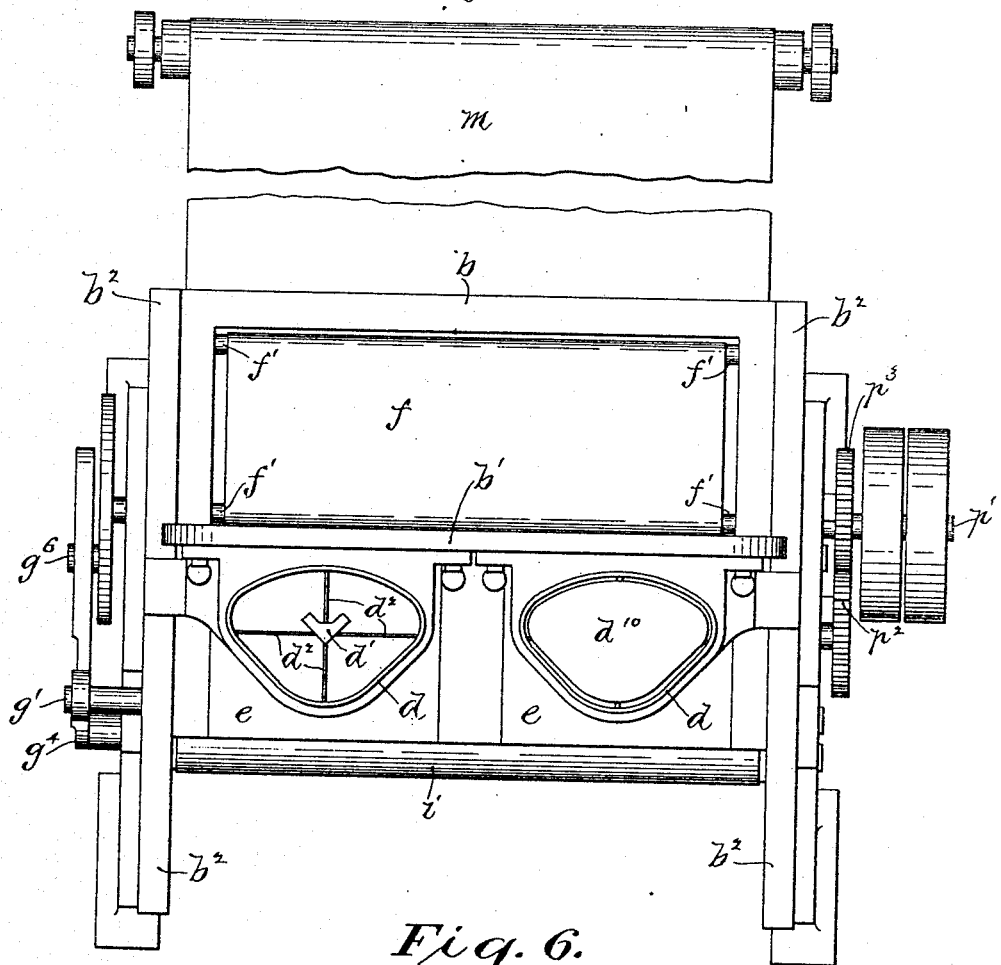
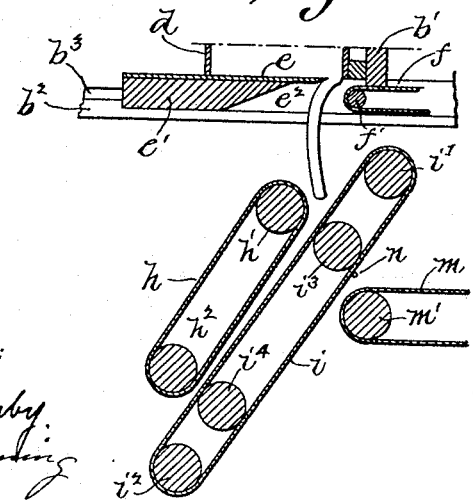
WITNESSES:
W. H. Canby
J. L. Manning
INVENTOR
Hugh L. Manning,
BY
Henry E. Everding,
ATTORNEY.

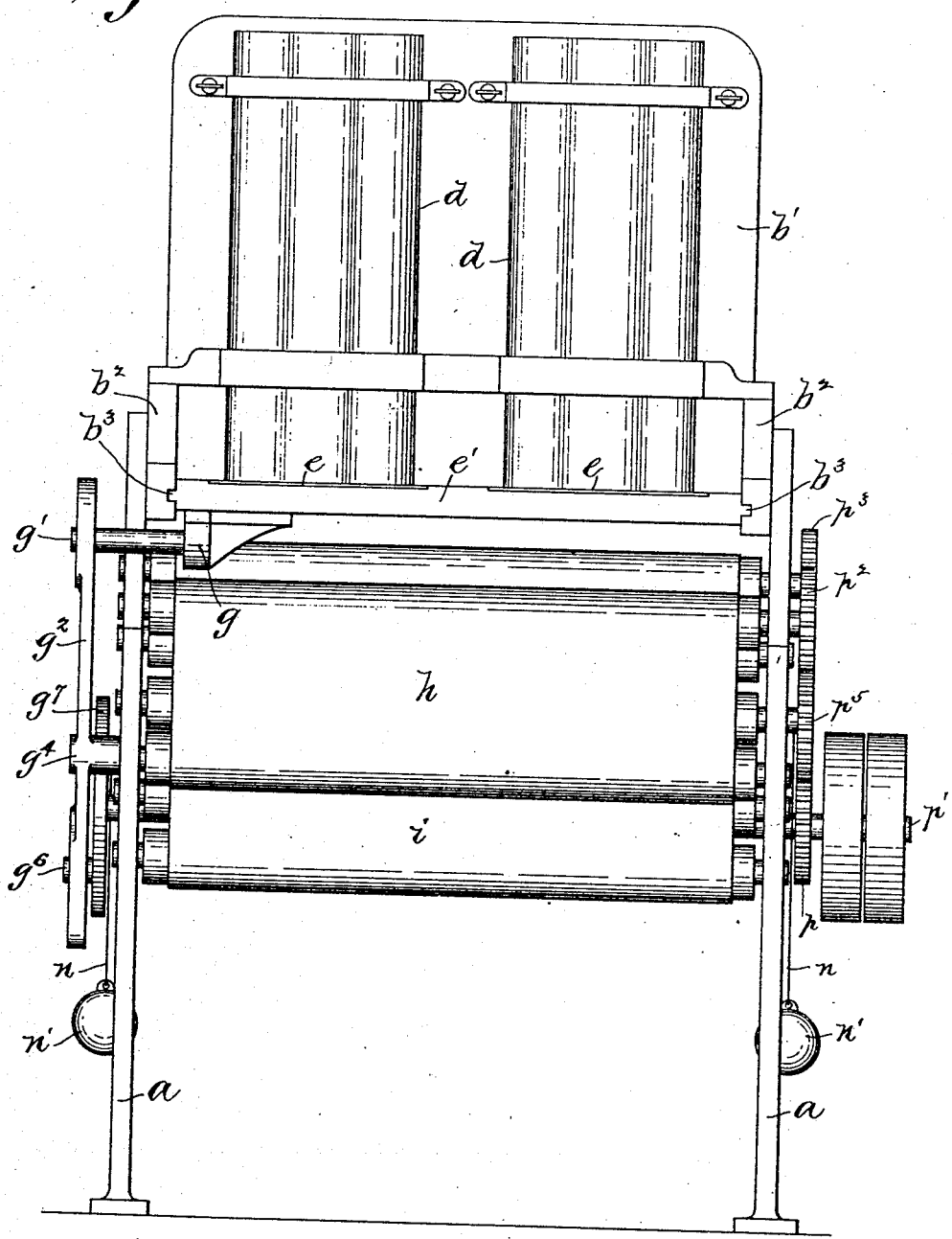

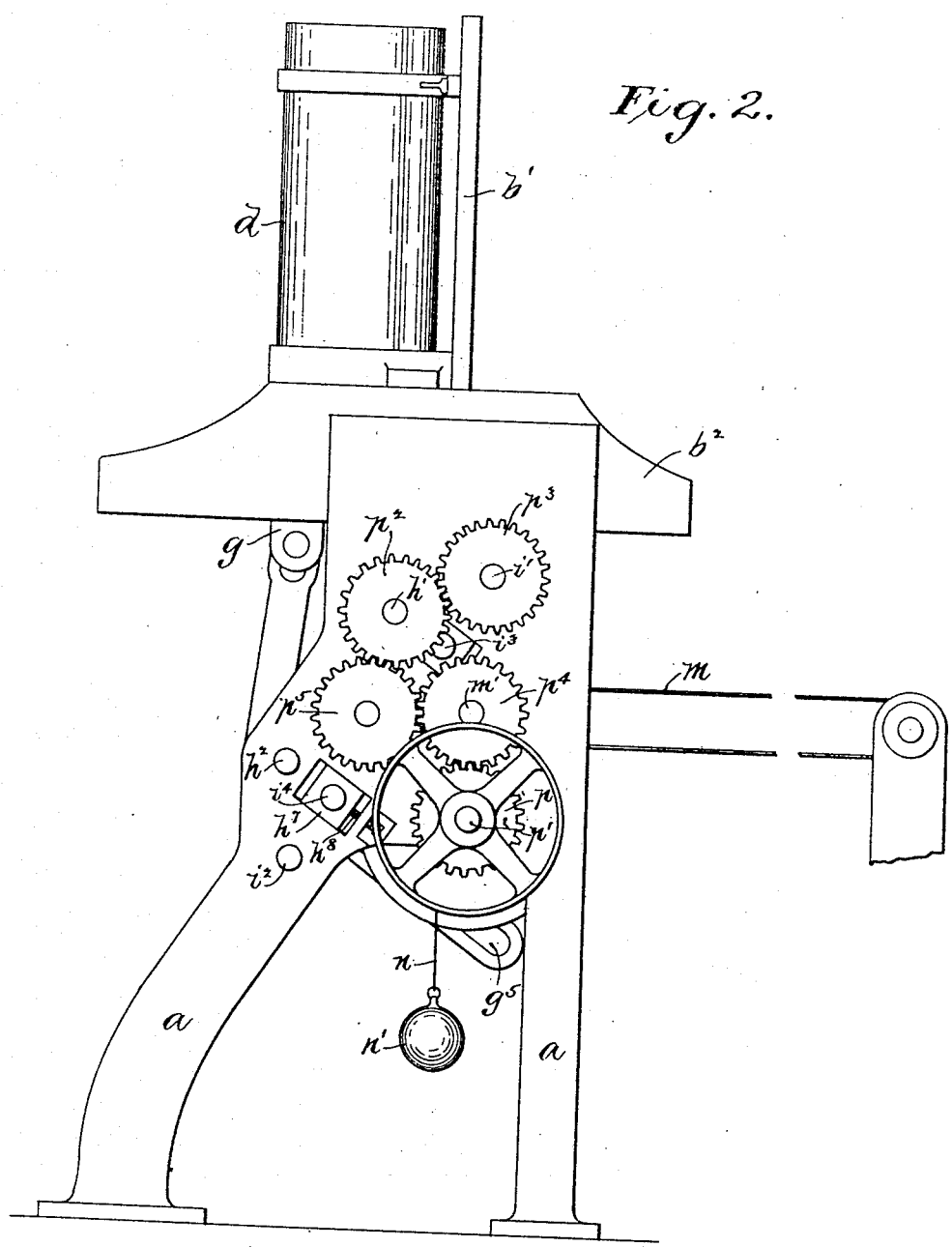

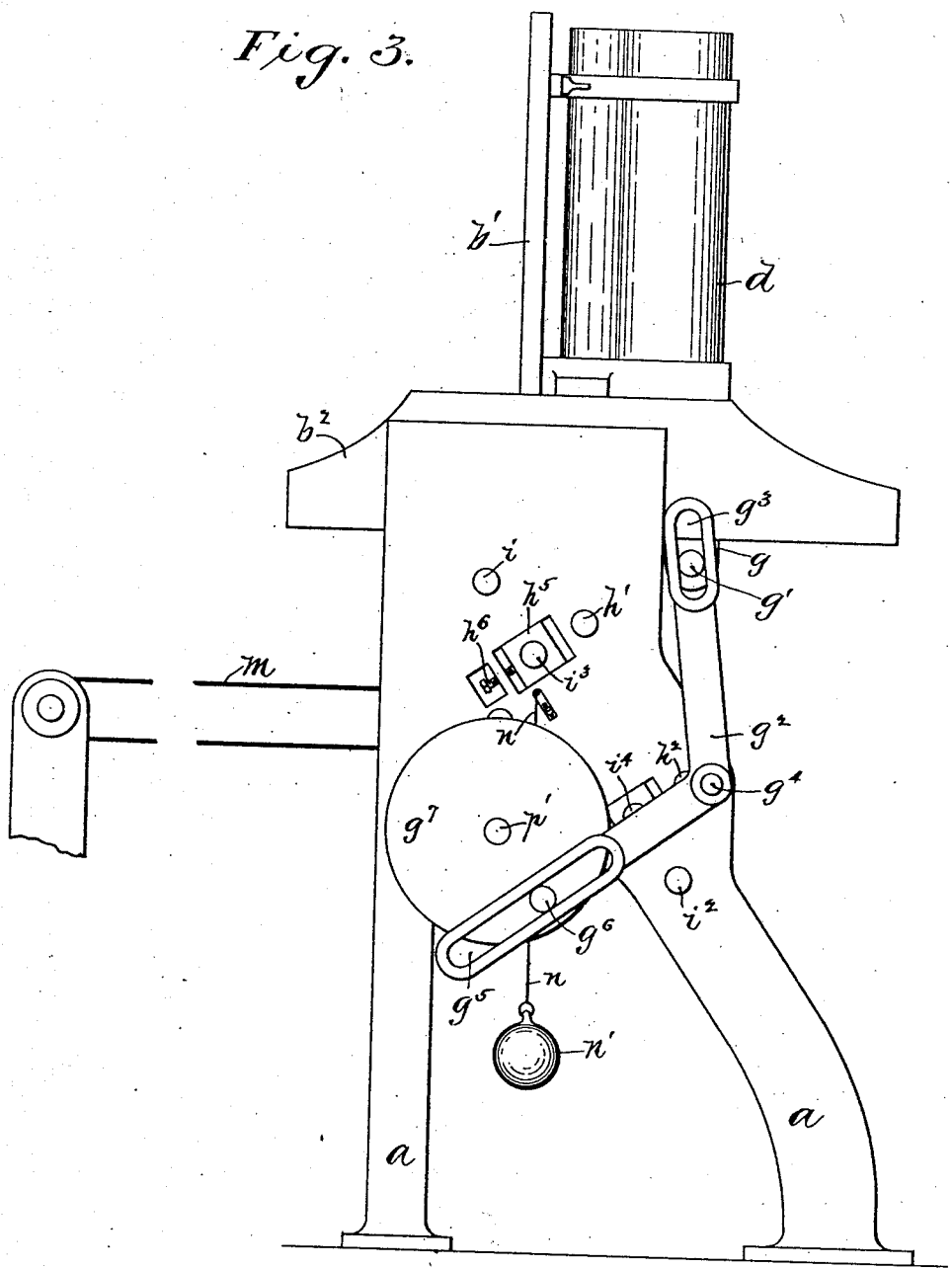

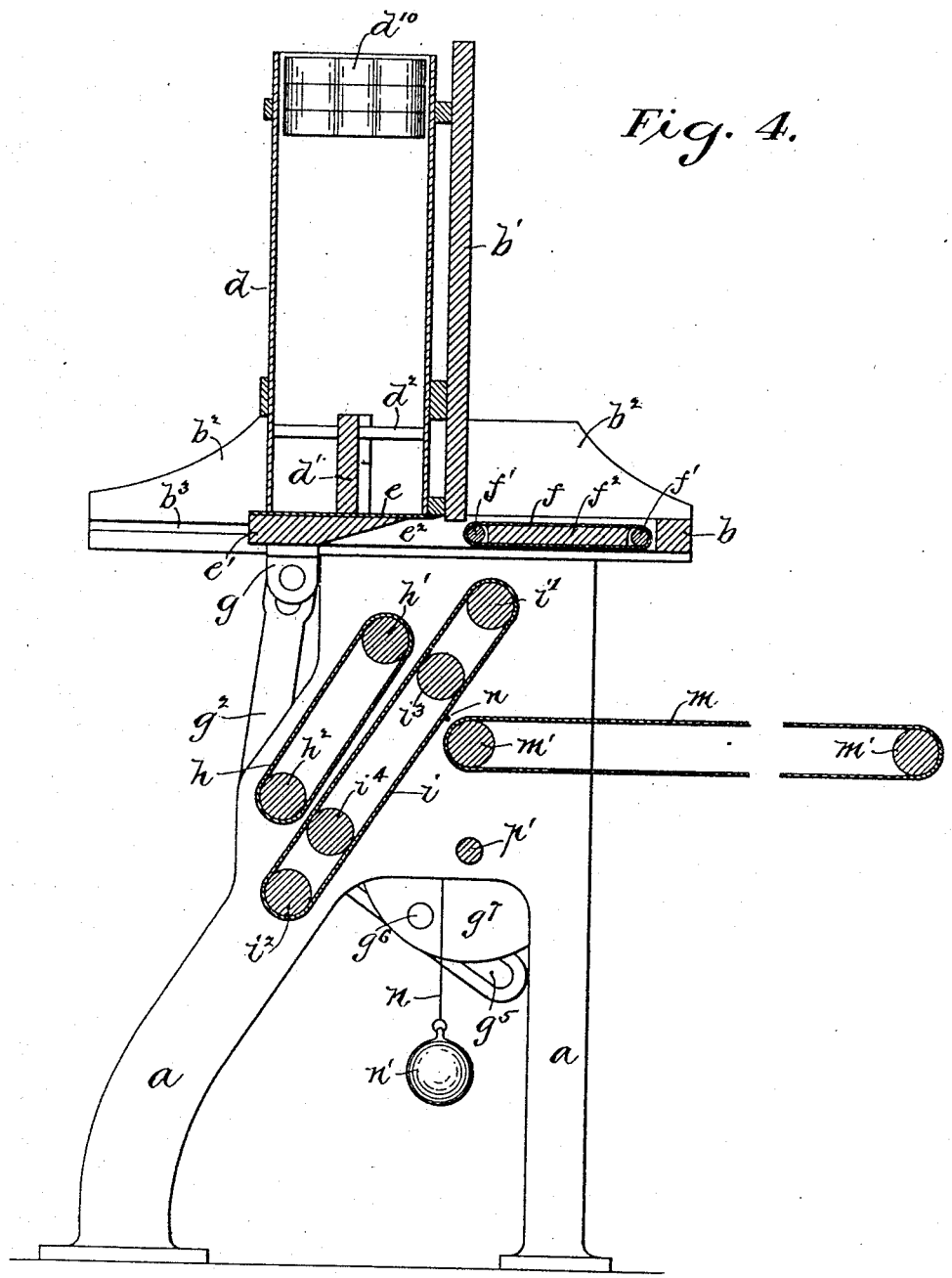

No. 782,614. Patented February 14, 1905.

UNITED STATES PATENT OFFICE.

HUGH L. MANNING, OF PHILADELPHIA, PENNSYLVANIA.

PIE-MAKING MACHINE.

SPECIFICATION forming part of Letters Patent No. 782,614, dated February 14, 1905.

Application filed November 2, 1904. Serial No. 231,053.

*To all whom it may concern:*

Be it known that I, HUGH L. MANNING, a citizen of the United States, residing at the city of Philadelphia, in the county of Philadelphia and State of Pennsylvania, have invented certain new and useful Improvements in Pie-Making Machines, of which the following is a specification.

My invention has relation to a pie-making machine of the general type described and claimed in Letters Patent No. 748,392, granted to me under date of December 29, 1903, and the present improvements have special relation to the mechanism or means for forming the crusts of the pie to be fed into the machine.

As is well known to those skilled in the art of making pies, the crusts are formed of a dough which must be manipulated with care and which if overworked becomes tough and undesirable. Heretofore it has been suggested that the dough should be rolled into a sheet of required thinness in the machine and thereafter cut into circular form by proper means. Such a method of forming the crusts is, for instance, described in my said Patent No. 748,392.

The principal object of my present invention is to slice the dough into slabs and to then work the slabs to a required thinness, the working not only thinning the slab, but also forming the slab into a circular sheet of required diameter to form a crust. To accomplish this object, there is provided certain mechanisms or means—namely, a hopper or receptacle for the dough, a reciprocating knife with coacting accessories arranged to slice the dough in the hopper into slabs, and aprons or mechanism whereby the slabs may not only be reduced to a required thinness, but formed into circular shape, so as to constitute the crust of the pie. These mechanisms and means will be fully described in this specification and embodied in the claims.

The nature and scope of my invention will be more fully understood from the following description, taken in connection with the accompanying drawings, forming part hereof, which—

Figure 1 is an end elevational view of a machine embodying main features of my invention. Fig. 2 is a side elevational view of the same, showing the power-transmitting means. Fig. 3 is an elevational view of the opposite side of the machine. Fig. 4 is a vertical sectional view of the machine. Fig. 5 is a top or plan view; and Fig. 6 is a view, diagrammatic in character, to illustrate the slicing operation.

Referring to the drawings, $a$ represents the framework of the machine, and $b$ the table supported by said framework. From the table $b$ extends upwardly a standard or support $b'$, and to this support $b'$ is removably secured a hopper or hoppers $d$ for the reception of the dough. In the drawings two such hoppers $d$ are illustrated side by side, and such an arrangement is preferable or desirable when two crusts—a top and a bottom crust—are to be used in the formation of the pie. It will of course be understood, however, that one hopper $d$ could be used in the machine or that a plurality of hoppers $d$ could be employed without departing from the spirit of my invention. The dough in the hoppers is preferably pressed downward therein by a weight or weights $d^{10}$, as illustrated in Fig. 4. The hoppers $d$ are each open at either end, and one hopper, which contains the dough for the upper crust, is preferably provided with a die $d'$, supported centrally in the hopper by two or more straps $d^2$. This die $d'$ forms in the dough in the hopper a central opening which in cross-section resembles the outline of a letter and is designed to mark or perforate the upper crust in such a manner that when said crust is afterward rolled it will have a letter or character in approximately its center, and this letter or character will serve to indicate the contents of the finished pie. Below the lower open ends of the hopper $d$ is arranged a reciprocatory knife $e$ and a reciprocatory and rotatable endless apron or band $f$. The knife $e$ is in front of the apron or band $f$ and serves, in conjunction with said band, to slice off from the lower part of the dough protruding from a hopper a slab of a certain thickness. The apron $f$ serves normally as a rest or support for the dough exuding from the lower end of the hopper or hoppers $d$, and it likewise serves to gage the thickness of the slab to be cut by the reciprocatory knife $e$. As shown in the drawings, the apron $f$ is passed around the rollers $f'$ and around a frame $f^2$, in which the rollers $f'$ are free to rotate, and to the front end of this frame $f^2$ is connected a slide $e'$, carrying the knife-blade $e$. Below the cutting edge of the blade $e$ the slide $e'$ is cut away, as at $e^2$, to leave a space for the passage downward of a slab of dough as it is cut by the knife-blade $e$, as clearly indicated in Figs. 4 and 6. The frame $f^2$, carrying the slide $e'$ and blade $e$, and the rollers $f'$ and apron $f$ are arranged to reciprocate in the sides $b^2$ of table $b$, which sides $b^2$ are grooved, as at $b^3$, for this purpose. The preferred mechanism for reciprocating the frame $f^2$ consists, as shown, of a bracket $g$, fixed to the under side of the slide $e'$, a pin $g'$, projecting from said bracket $g$, and a bell-crank lever $g^2$, having the slot $g^3$ in one arm, to which the pin $g'$ is connected. The bell-crank lever $g^2$ is pivoted, as at $g^4$, in the framework $a$ of the machine and has a slot $g^5$ in its other arm, to which is connected a pin $g^6$, projecting eccentrically from a disk $g^7$. The disk $g^7$ has a shaft directly rotated by the power-transmitting mechanism to be hereinafter described.

The rollers $f'$ and the apron $f$ during their reciprocation pass under standard $b'$ of the table $b$, as illustrated in Figs. 4 and 6. It follows, therefore, that when the frame $f^2$, carrying these rollers $f'$, is reciprocated the apron $f$ and rollers $f'$ are turned by frictional contact with the standard $b'$ of the table $b$, and the apron $f$ is thus shifted in a direction opposite to that in which the knife $e$ and frame $f^2$ move. The hoppers $d$ are each preferably ellipsoidal in cross-section, as illustrated in Fig. 5, and the dough as it is supported by the apron $f$ and frame $f^2$ prior to being sliced off by the knife is of the same cross-section. The slab of dough cut off by the knife $e$ is therefore ellipsoidal, being more or less pointed at that side to which the knife $e$ is first presented. The slab as it is cut off by the knife is fed downward partly by gravity and partly by the rotation of apron $f$, as clearly illustrated in Fig. 6, and falls through the opening $e^2$ between the slide $e'$ and the frame $f^2$. Two endless bands or aprons $h$ and $i$ are arranged below this opening to receive the slab and to work it out into required circular shape and of a thinness necessary to constitute the crust. As illustrated, these aprons or bands $h$ and $i$ are preferably inclined from a vertical plane in the machine, the back apron $i$ being more inclined to said plane than the front apron $h$ to thus form at the upper ends of the aprons $h$ and $i$ an angular throat or mouth to more readily receive the slab as it falls from the cutting mechanism. The apron $h$ is passed around an upper roll $h'$ and a lower roll $h^2$, and the apron $i$ extends some distance above and some distance below the rolls $h'$ and $h^2$, respectively. The apron $i$ is passed around an upper roll $i'$, a lower roll $i^2$, and two intermediate rolls $i^3$ and $i^4$. The intermediate rolls $i^3$ and $i^4$ are arranged opposite the rolls $h'$ and $h^2$ of the apron $h$ and coöperate with said rolls $h'$ $h^2$ to elongate the dough in a direction parallel with the shorter axis of the elliptical slab. The distance between roll $h'$ and roll $i^3$ is slightly larger than the distance between roll $h^2$ and roll $i^4$, so that the flattening of the slab between aprons $h$ and $i$ is gradual from the point where the slab enters between said aprons and the point where it leaves the apron $h$.

The slab of dough worked to required shape and thinness between the aprons $h$ and $i$ passes, with the apron $i$ upon its rear portion, upward in the machine until it reaches a conveying mechanism, which in the simplest form may be an endless band or belt $m$ passed around the rollers $m'$. This conveying mechanism is designed to feed the formed crust to the pie-plate and to mechanism for filling the crust, &c. In order to insure the transferring of the crust from the rear face of apron $i$ to the belt $m$, a wire $n$ or other suitable stripping means is stretched under tension of weights $n'$ across the apron $h$ at the point where the slab is to be discharged upon the belt $m$.

An important feature of my present invention resides in the material of which the apron $f$, the apron $h$, and the apron $i$ are made. The dough as it is sliced and during the working of the same is more or less sticky and ordinarily would cling to the various aprons if they were not frequently sprinkled with flour. I have found, however, that if a material to which the dough will not readily stick be used the flouring of the aprons in frequent intervals is not at all necessary. A good material for the aprons will be found to be oiled silk, and although oiled silk is preferred it is obvious that other fabrics or materials may be used treated with oils, gums, &c., or untreated.

The rolls $h'$ and $i^3$ are made adjustable with respect to each other to increase or decrease the distance between them, and hence to vary the thinness of the sheet or slab of dough as it passes between said rolls $h'$ and $i^3$. To adjust said rolls $h'$ and $i^3$, one roll—$i^3$, by preference—is carried in sliding boxes $h^5$, (see Fig. 3,) and set-screws $h^6$ serve to adjust the boxes $h^5$ as required. In a similar manner and for a similar purpose the rolls $h^2$ and $i^4$ are adjustable, one roll—$i^4$, by preference—being carried in sliding boxes $h^7$, adjusted by set-screws $h^8$, as illustrated in Fig. 2.

The machine is operated by a chain of gears connected with a main driving-gear $p$ or the power-shaft $p'$. Of this chain of gears the gear $p^2$ is connected directly with the roll $h'$, gear $p^3$ with the roll $i'$, and gear $p^4$ with roller $m'$ of the band $m$. An idler $p^5$ seto properly connect the gearing. The disk $g^7$, which serves to reciprocate the knife $e$, is preferably located upon the power-shaft $p'$.

Having thus described the nature and object of my invention, what I claim as new, and desire to secure by Letters Patent, is—

1. In a machine of the character described, a hopper for the reception of the dough having a lower open end, a frame and apron normally closing said open end, a knife arranged in front of said frame and apron and means for reciprocating the knife, frame and apron across the open end of the hopper.

2. In a machine of the character described, a hopper for the reception of the dough, a die supported within the hopper adjacent to its discharge end, a frame and apron normally closing said discharge end, means for pressing the dough in said hopper past said die and through the discharge end toward the frame and apron, a knife carried by the frame and means for reciprocating the knife, frame and apron across the discharge end of the hopper.

3. In a machine of the character described, a hopper for the reception of the dough, means for pressing the dough in said hopper through the discharge end of said hopper, a frame and apron normally closing said discharge end, a knife carried by said frame, and means for reciprocating said knife, frame and apron across the discharge end of the hopper.

4. In a machine of the character described, a hopper for the reception of the dough having an open disharge end, a frame normally closing said end and located some distance below the same, an endless band rotating in said frame and a knife arranged to reciprocate across the discharge end of said hopper some distance above the frame, whereby the frame constitutes a support and gage for the dough during the movement of the knife in one direction.

5. In a machine of the character described, a hopper for the dough means for slicing slabs of dough from the discharge end of said hopper, and means located adjacent to the slicing means and adapted to work said slab into required form and thinness.

6. In a machine of the character described, a hopper for the dough, means adapted to slice the dough from the discharge end of said hopper into slabs or sheets and a means for working the slabs into required shape and thinness, said means consisting of two endless bands arranged in proximity to each other, one of said bands being longer than the other, two rolls arranged respectively at the ends of the shorter of said bands, two rolls arranged respectively at the ends of the longer of said bands, and two rolls arranged intermediately of the ends of the longer band and coöperating with the rolls of the shorter band to work the slabs.

7. In a machine of the character described, in combination with means for slicing pie-dough into slabs and means for working said slabs into crusts of required shape and thinness, of an endless conveyer arranged adjacent to the working means and adapted to receive the crusts.

8. In a machine of the character described in combination with means for slicing pie-dough into slabs and two endless bands between which the slabs are worked into crusts of required shape and thinness, of an endless conveyer arranged adjacent to one of said bands and stripping means adapted to transfer the crusts from said band to said conveyer.

9. In a machine of the character described, a means for slicing dough into slabs combined with a means for working said slabs into required form and thinness, said working means consisting of two endless bands or aprons each formed of a material non-adhesive to the dough.

10. In a machine of the character described, a means for slicing dough into slabs combined with two endless bands or aprons arranged to work said slabs into required form and thinness, each of said aprons being formed of oiled silk.

11. In a machine of the character described, a receptacle for the pie-dough, said receptacle being ellipsoidal in cross-section, a means for slicing the dough into ellipsoidal blanks and a means for elongating the blanks in a direction parallel to their shorter axis to form said blanks into circular crusts of required thickness.

In testimony whereof I have signed my name in the presence of two witnesses.

HUGH L. MANNING.

Witnesses:
   JOSEPH L. MANNING,
   GUSTAV BERINGER.